United States Patent
Buckland

(10) Patent No.: US 8,213,460 B1
(45) Date of Patent: Jul. 3, 2012

(54) METHOD AND SYSTEM FOR PROCESSING TRAFFIC IN AN ACCESS NETWORK

(75) Inventor: Kenneth M. Buckland, Santa Rosa, CA (US)

(73) Assignee: Cisco Technology, Inc., San Jose, CA (US)

( * ) Notice: Subject to any disclaimer, the term of this patent is extended or adjusted under 35 U.S.C. 154(b) by 2411 days.

(21) Appl. No.: 09/657,068

(22) Filed: Sep. 7, 2000

(51) Int. Cl.
*H04J 3/24* (2006.01)

(52) U.S. Cl. .......................... 370/474; 370/463; 370/467

(58) Field of Classification Search ............... 370/395.5, 370/395.51, 395.52, 395.6, 401, 389, 465, 370/466, 460.1, 395, 522, 395.43, 394, 397, 370/395.63, 395.65, 395.1; 709/229, 235, 709/224; 379/114.01

See application file for complete search history.

(56) References Cited

U.S. PATENT DOCUMENTS

| | | | |
|---|---|---|---|
| 5,570,362 A | 10/1996 | Nishimura | 370/60.1 |
| 5,577,039 A | 11/1996 | Won et al. | 370/60.1 |
| 5,734,653 A | 3/1998 | Hiraiwa et al. | 370/395 |
| 5,835,710 A * | 11/1998 | Nagami et al. | 709/250 |
| 5,848,067 A | 12/1998 | Osawa et al. | 370/394 |
| 5,943,339 A | 8/1999 | Mauger | 370/397 |
| 5,956,681 A * | 9/1999 | Yamakita | 704/260 |
| 6,016,319 A * | 1/2000 | Kshirsagar et al. | 370/410 |
| 6,085,245 A * | 7/2000 | Kaycee et al. | 709/224 |
| 6,243,382 B1 | 6/2001 | O'Neill et al. | 370/395 |
| 6,292,491 B1* | 9/2001 | Sharper | 370/412 |
| 6,343,083 B1* | 1/2002 | Mendelson et al. | 370/466 |
| 6,353,619 B1* | 3/2002 | Banas et al. | 370/463 |
| 6,404,782 B1 | 6/2002 | Berenbaum et al. | 370/522 |
| 6,418,145 B1* | 7/2002 | Isoyama et al. | 370/395.65 |
| 6,442,167 B1 | 8/2002 | Aramaki et al. | 370/395.43 |
| 6,463,476 B1* | 10/2002 | Milles | 709/235 |
| 6,504,844 B1* | 1/2003 | Keller-Tuberg | 370/397 |
| 6,512,821 B1* | 1/2003 | Johnstone et al. | 379/114.01 |
| 6,590,896 B1* | 7/2003 | Schrodi et al. | 370/395.52 |
| 6,625,119 B1* | 9/2003 | Schuster et al. | 370/230 |
| 6,678,474 B1* | 1/2004 | Masuda et al. | 398/75 |
| 6,781,994 B1* | 8/2004 | Nogami et al. | 370/395.1 |
| 6,891,825 B1* | 5/2005 | O'Dell et al. | 370/352 |

OTHER PUBLICATIONS

ITU-T Recommendation I.363, "B-ISDN ATM Adaptation Layer (AAL) Specification," Mar. 1993, 100 pages.
Bellcore GR-253-CORE, "Synchronous Optical Network (SONET) Transport Systems: Common Generic Criteria," Issue 2, Dec. 1995 (with rev. Jan. 1999), 788 pages.
ATM Forum, "Circuit Emulation Service Interoperability Specification," Version 2.0, Jan. 1997, AF-VTOA-0078.000, 101 pages.
ATM Forum, "Specifications of (DBCES) Dynamic Bandwidth Utilization—in 64Kbps Time Slot Trunking over ATM—Using CES," Jul. 1997, AF-VTOA-0085.000, 32 pages.

(Continued)

*Primary Examiner* — Robert Wilson
(74) *Attorney, Agent, or Firm* — Baker Botts L.L.P.

(57) ABSTRACT

A method and system for processing traffic in an access network includes receiving a plurality of ingress traffic streams from customer premise equipment (CPE). Each ingress traffic stream includes a plurality of Internet Protocol (IP) packets having an IP address. The ingress traffic streams are aggregated into a combined traffic stream without regard to the IP addresses. The combined traffic stream is transmitted to a backbone network for routing based on the IP addresses. An egress traffic stream is received from the backbone network and includes a plurality of IP packets each having an IP address. A CPE port is determined for each IP packet based on its IP address. The IP packets are routed to their respective CPE ports and transmitted to their destination CPEs.

25 Claims, 4 Drawing Sheets

OTHER PUBLICATIONS

Bellcore GR-2837, "ATM Virtual Path Ring Functionality in SONET—Generic Criteria," Feb. 1998, 154 pages.

Power PC, POWERQUICC™, MPC860 User's Manual Motorola, © 1996, 1,143 pages, Jul. 1998.

International Telecommunication Union, Series I: Integrated Servicdes Digital Network, "B-ISDN operation and maintenance principles and functions," Feb. 1999, 116 pages.

"About ATM" www.atmforum.com/atmforum/library/notesl, 2, 3, 4 and 5 printed Aug. 30, 1999, 5 pages.

U.S. Appl. No. 09/390,420, entitled "Method and System for Transmitting Traffic Having Disparate Rate Components," filed Sep. 3, 1999, 30 pages.

U.S. Appl. No. 09/419,204, entitled "Method and System for Distributed Processing of Traffic in a Telecommunications Node," filed Oct. 15, 1999, 37 pages.

U.S. Appl. No. 09/452,753 entitled "Method and System for Transporting Synchronous and Asynchronous Traffic on a Synchronous Bus of a Telecommunications Node," filed Dec. 1, 1999, 124 pages.

U.S. Appl. No. 09/452,759, entitled "Fused Switch Core and Method for a Telecommunications Node," filed Dec. 1, 1999, 114 pages.

U.S. Appl. No. 09/452,746, entitled "Method and System for Transporting Synchronous and Asynchronous Traffic on a Bus of a Telecommunications Node," filed Dec. 1, 1999, 122 pages.

U.S. Appl. No. 09/452,829, entitled "Rate Adjustable Backplane and Method for a Telecommunications Node," filed Dec. 1, 1999, 119 pages.

U.S. Appl. No. 09/452,830, entitled "Asynchronous Transfer Mode (ATM) Switch and Method for a Telecommunications Node," filed Dec. 1, 1999, 119 pages.

U.S. Appl. No. 09/452,751, entitled "Synchronous Switch and Method for a Telecommunications Node," filed Dec. 1, 1999, 119 pages.

U.S. Appl. No. 09/452,828, entitled "Time Slot Interchanger (TSI) and Method for a Telecommunications Node," filed Dec. 1, 1999, 117 pages.

U.S. Appl. No. 09/607,771, entitled "Method and System for Protection Switching in a Telecommunications Network," filed Jun. 30, 2000, 32 pages.

U.S. Appl. No. 09/628,532, entitled "Method and System for Reprogramming Instructions for a Switch," filed Jul. 31, 2000, 35 pages.

"Asynchronous Transfer Mode (ATM) Switching," printed from www.cisco.com on Aug. 27, 2002, 19 pages.

* cited by examiner

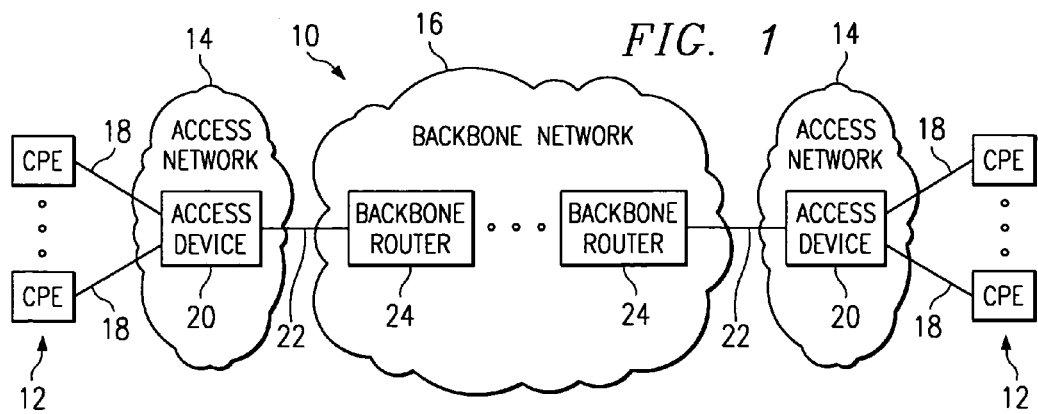
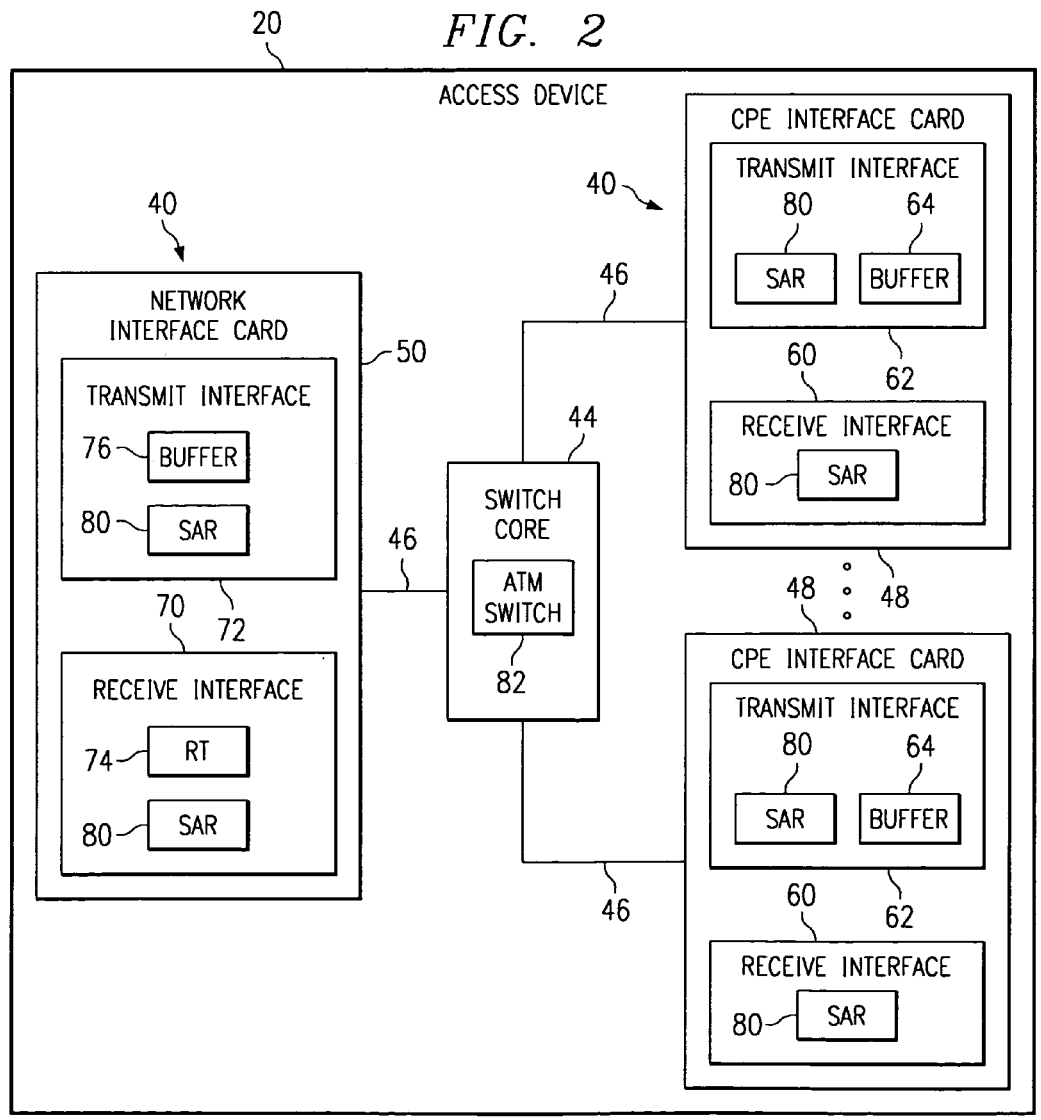

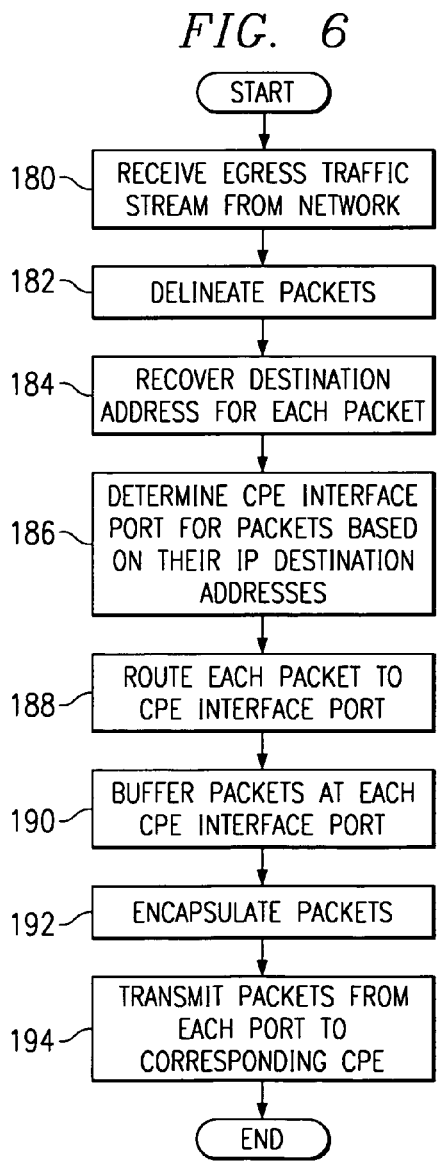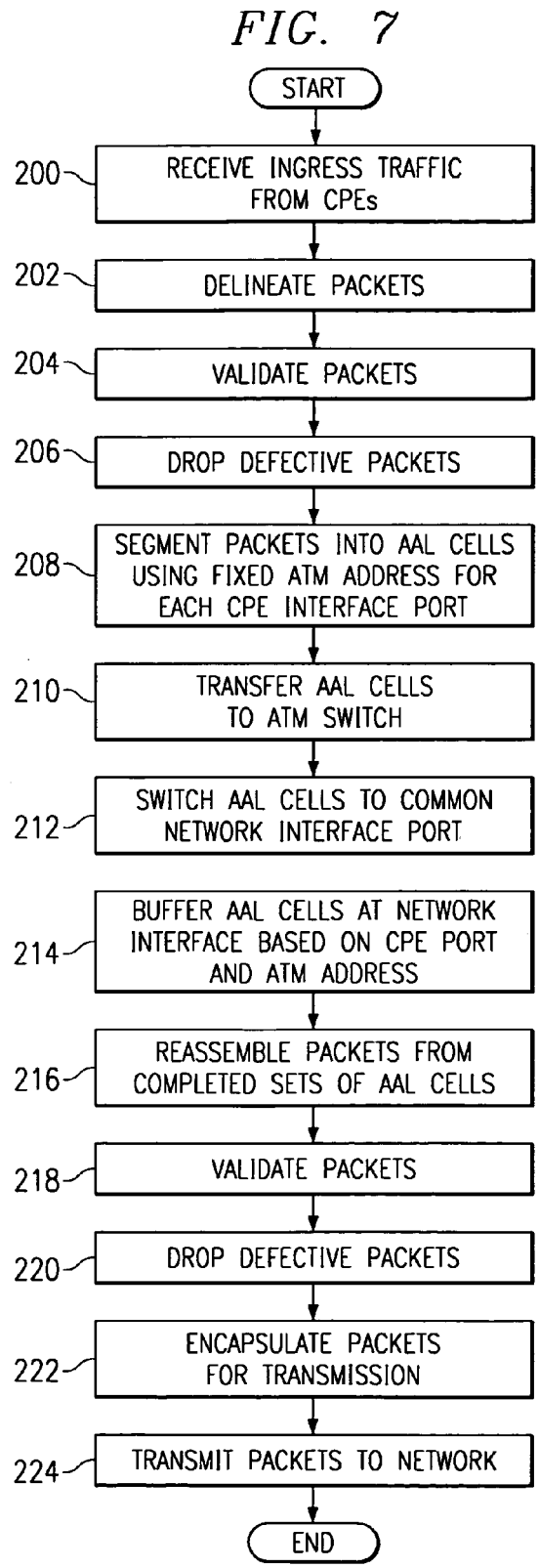

METHOD AND SYSTEM FOR PROCESSING TRAFFIC IN AN ACCESS NETWORK

TECHNICAL FIELD OF THE INVENTION

This invention relates generally to the field of access networks, and more particularly, to a method and system for processing traffic in an access network.

BACKGROUND OF THE INVENTION

Telecommunications networks include backbone networks having the main voice and data switches and access networks that carry traffic from the main voice and data switches out to business and residential subscribers. Historically, access networks have carried either voice traffic or data traffic converted into a voice format through modems and similar devices. With the advent of the Internet, the majority of data traffic is now carried in Internet Protocol (IP) packets.

Transporting data natively as IP packets using IP routing, however, requires extensive messaging and configuration overhead. High capacity IP routing can be efficiently implemented with hardware-based solutions in the backbone network due to the large economies of scale. Low capacity IP routing can also be efficiently implemented at customer premises using software-based routing solutions that exploit the low cost of microprocessors. IP routing, however, cannot be efficiently implemented in the intermediate speed access network where neither economies of scale nor low cost microprocessors can be exploited.

Recent developments in access networks have included the incorporation of asynchronous transport mode (ATM) functionality in access equipment. ATM switching equipment is relatively inexpensive compared with IP routers, which is a primary consideration in access networks due to the wide distribution of access equipment. The overhead of ATM cells (5 bytes for every 48 bytes of payload), however, makes ATM less attractive as a transport technology.

SUMMARY OF THE INVENTION

The present invention provides an improved method and system for processing traffic in an access network that substantially eliminates or reduces the problems and disadvantages of previous systems and methods. In particular, Internet Protocol (IP) traffic is routed only one way in the access network to minimize processing. In addition, incoming traffic may be converted to asynchronous transport mode (ATM) cells for efficient switching within the access network or within a single access unit and converted back to IP packets at the edge of the access network for efficient transport.

In accordance with one embodiment of the present invention, the method and system for processing traffic in an access network includes receiving a plurality of ingress traffic streams. Each ingress traffic stream includes a plurality of IP packets having an IP address. The ingress traffic streams are aggregated into a combined traffic stream without processing the IP addresses. That is, the packets are combined into a single stream regardless of final destination. The combined traffic stream is transmitted to a backbone network for routing based on the IP addresses. An egress traffic stream is received from the backbone network and includes a plurality of IP packets each having an IP address. A customer premise equipment (CPE) port is determined for each IP packet based on its IP address. The IP packets are routed to their respective CPE ports and transmitted to their destination CPEs.

More specifically, in accordance with a particular embodiment of the present invention, the incoming IP packets from both the ingress and egress traffic streams are segmented into ATM adaption layer (AAL) cells for switching within the access network or within a single unit and reassembled back into IP packets at the edge of the IP network. In this embodiment, ingress IP packets are segmented at each CPE port using a fixed. ATM address associated with the CPE port. Egress IP packets are segmented at a network port using an ATM address identified by looking up each IP address in static routing tables.

Technical advantages of the present invention include providing an improved access network and equipment. In particular, ingress packets from customer premise equipment (CPE) to the backbone network are aggregated into a single packet stream that is passed to the backbone network. Egress packets from the backbone network to the CPE are routed using static routing tables. Accordingly, the access network and equipment need provide only limited egress routing which greatly reduces the complexity and cost of the equipment and the network.

Another technical advantage of the present invention includes providing an improved method and system for routing traffic in the access network. In particular, incoming IP traffic is segmented into ATM cells and efficiently switched within the access network or within a single access unit. The traffic is converted back to IP traffic at the edge of the access network for transport efficiency across the backbone network. Accordingly, traffic processing efficiency is maximized in the access network while maintaining transport efficiency outside of the network.

Other technical advantages of the present invention will be readily apparent to one skilled in the art from the following figures, description, and claims.

BRIEF DESCRIPTION OF THE DRAWINGS

For more complete understanding of the present invention and its advantages, reference is now made to the following description taken in conjunction with the accompanying drawings, wherein like reference numerals represent like parts, in which:

FIG. 1 is a block diagram illustrating a telecommunications system in accordance with one embodiment of the present invention;

FIG. 2 is a block diagram illustrating details of the access device of FIG. 1 in accordance with one embodiment of the present invention;

FIG. 6 is a flow diagram illustrating a method for processing egress traffic in an access network in accordance with one embodiment of the present invention;

FIG. 7 is a flow diagram illustrating a method for processing ingress traffic in an access network using ATM switching in accordance with one embodiment of the present invention.

DETAILED DESCRIPTION OF THE INVENTION

Figure 3:
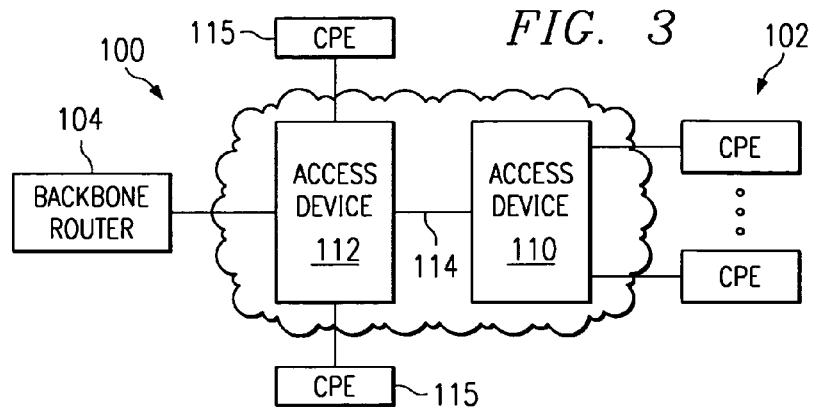
FIG. 3 is a block diagram illustrating interconnection of the plurality of access devices in an access network in accordance with one embodiment of the present invention.

FIG. 1 illustrates a telecommunications system 10 in accordance with one embodiment of the present invention. The telecommunications system 10 transmits voice, data, video, other suitable types of information and/or a combination of different types of information between source and destination points.

Referring to FIG. 1, the telecommunications system includes customer premise equipment (CPE) 12, an access network 14, and a backbone network 16. The access network 14 connects the CPE 12 to the backbone network 16 and communicates voice, data, video and/or other types of information between the CPE 12 and the network 16. In the illustrated embodiment, the CPEs 12, access network 14, and backbone network 16 communicate traffic in Internet Protocol (IP) packets. It will be understood that traffic may be transported in other suitable packets in and between the customer premise equipment 12, access network 14 and backbone network 16 without departing from the scope of the present invention.

The CPEs 12 comprise business and residential equipment including standard telephones, modems, computers, dataphones, Web appliances, and/or other devices capable of generating traffic for transmission in the telecommunications system 10. The CPEs 12 may also include a network interconnecting the traffic generation devices, local switches, and a small IP hub or router. Each CPE 12 is connected to the access network 14 through a communication link 20. As used herein, each means every one of at least a subset of the identified items. The communication link is a T1 line, conventional twisted pair cable, fiber optic cable, or other suitable type of wireline and/or wireless link. For the IP traffic embodiment, the T1 interface includes 24 DS-0 channels, each representing a 64 kb/s stream, with a group concatenated to form a single hyper-channel for IP traffic. Some of the remainder DS-0 channels may be dedicated to voice traffic.

The access networks 14 receive, process and transport ingress traffic from the CPEs 12 to the backbone network 16 and egress traffic from the backbone network 16 to the CPEs 12. Each access network 14 is connected to the backbone network 16 through a communication link 22. For the IP traffic embodiment, the communication link 22 is an unchannelized DS-3, OC-3 packet over SONET (POS), or other suitable high capacity interface.

Each access network 14 includes one or more access devices 20. As described in more detail below, the access device 20 performs one-way access routing of traffic by aggregating ingress traffic without regard to its destination IP address into one or more predefined traffic streams for transport to the backbone network 16. Egress traffic is routed to the various CPEs 12 using static routing information that need only be modified when, for example, specific customer locations reached through the CPE 12 are added or removed. Accordingly, the access device 20 need not make routing decisions for ingress traffic and need only route egress traffic to a relatively small number of essentially static customers.

As also described in more detail below, the IP packets may be converted into asynchronous transport mode (ATM) adaption layer (AAL) cells in the access network 14 for efficient switching within the access network 14 and converted back to IP packets at the edge of the access network 14 for efficient transport to and processing in CPEs 12 and the backbone network 16.

The backbone network 16 includes portions of the Internet, one or more intranets, other wide or local area networks and/or other suitable switched or routed networks. In a particular embodiment, the backbone network 16 includes backbone routers 24 at its borders for communicating with the access devices 20. In this embodiment, the backbone routers may be Cisco 12000 routers. It will be understood that different types of backbone routers 24 as well as different types of devices capable of directing, switching or otherwise directing IP traffic may be used in and at the border of the backbone network 16.

FIG. 2 illustrates details of the access device 20 in accordance with one embodiment of the present invention. In this embodiment, the access device 20 is implemented in a card shelf configuration with functionality of the device distributed between discrete cards connected over a backplane having one or more inter card transmission links. It will be understood that other suitable types of access devices and/or nodes may be used in connection with the present invention.

Referring to FIG. 2, the access device 20 includes line cards 40, a switch core 44, and a backplane 46. The line cards 40 and switch cards of the switch core 44 each include hardware and logic operable to perform switch and other functionality of the cards. The logic may be embedded in hardware such as in an application specific integrated circuit (ASIC) or a field programmable gate array (FPGA) or comprise software stored in a computer-readable medium such as random access memory (RAM), read only memory (ROM) and/or other suitable memory. The line cards 40 are each a discrete card configured to plug into the backplane 46. The switch core 44 comprises one or more discrete switch cards also configured to plug into the backplane 46.

The line cards 40 include CPE interface cards 48 and one or more network interface cards 50. The CPE interface cards 48 each communicate with one or more CPEs 12 over the communications link 18. The network interface card 50 communicates with the backbone network over the communications link 22. It will be understood that other suitable types of interface line cards may be used in the access device 14.

The CPE interface and network cards 48 and 50 include one or more external interfaces, or ports, one or more internal interfaces and a traffic processor. Ports receive traffic from the external line and/or transmit traffic received by the internal interface from the switch core 44. The internal interfaces transmit traffic received by the ports from the external links and receive traffic from the switch core 44. The internal interface communicates with the switch core 44 over the backplane 46. The traffic processor is preferably local to the line card 40 and includes hardware and software for processing IP traffic, telephony voice (DS-0), synchronous transmission signal (STS) traffic, integrated services digital network (ISDN) traffic, synchronous optical network (SONET) traffic, synchronous digital hierarchy (SDH), asynchronous transfer mode (ATM) traffic, and/or other suitable traffic. The ports, internal interfaces and traffic processor of the cards 48 and 50 may be logically segmented into receive interfaces for processing traffic incoming to the access device 20 and transmit interfaces for processing traffic outgoing from the access device 20.

In one embodiment, the CPE interface card 48 is a low speed line card that sends and receives IP packets to and from the CPE 12 using T1 rate interfaces. In this embodiment, a receive interface 60 delineates high-level data link controller (HDLC) packets in the incoming bit stream and routes IP packets in the stream through the switch core 44 to the network interface card 50 for transmission to the backbone network 16. A transmit interface 62 receives routed IP packets from the network interface card 50 after they are switched by the switch core 44. The packets are buffered in buffer 64 one after another and transmitted in a first-in, first-out (FIFO) order after wrapping them in the HDLC packet delineation format.

The network interface card 50 is a high speed line card that sends and receives IP packets to and from the backbone network 16 using DS-3 or OC-3 rate interfaces. A receive interface 70 delineates HDLC packets in the incoming traffic stream and recovers an IP destination address in each IP packet. The receive interface 70 uses a routing table 74 to determine the CPE interface port for each IP packet based on its IP destination address. The receive interface 70 then routes the IP packet to that port for transmission. A transmit interface 72 receives IP packets from the CPE interface ports and buffers the IP packets one after the other in buffer 76. The transmit interface 72 then transmits the IP packets in a first-in, first-out (FIFO) order after wrapping the IP packets in the HDLC packet delineation format.

In operation, traffic is routed one-way through the access device 20. IP packets are passed from the backbone network 16 to the CPE 12 and from the CPE 12 to the backbone network 16, but are not routed directly from one piece of CPE 12 through the access device 20 to another piece of CPE 12. Thus, for an IP packet to get from one piece of CPE 12 to another, the IP packet hair-pins through the backbone router 24 of the backbone network 16. The one-way routing restriction simplifies routing operations performed by the access device 20. Specifically, in the ingress direction from the CPE 12 to the backbone network 16, no routing is performed or required. This is because all of the ingress packets are aggregated into a single large packet stream or other predefined streams that are passed to the backbone network 16. No routing decisions need be made.

In the egress direction from the backbone network 16 to the CPE 12, routing decisions determine how the IP packets from the network 16 should be disbursed to the various CPE 12. This routing is straightforward because the CPE 12 constitutes a relatively static set of IP destinations that are stored in the static routing table 74. The routing table 74 need be modified only when specific customer locations reached through the CPE 12 are added or removed. As a result, egress packets are routed only to a relatively small number of basically static customers that rarely change after set-up, which simplifies the operation of the access device 14.

In a particular embodiment of the present invention, access routing is performed by the access devices 20 using ATM switching. In this embodiment, the transmit and receive interfaces 60, 62, 70, and 72 of the CPE and network interface cards 48 and 50 each include a segment and reassembly (SAR) element 80. The SARs 80 segment incoming IP packets into ATM adaption layer (AAL) cells using ATM adaptation layer 5 (AAL-5) or other suitable standard or modified standard. The AAL cells are switched by the switch core 44 and thereafter reassembled back into IP packets for transmission on an outgoing interface.

In the ATM switching embodiment, the receive interface 60 of the CPE interface 48 delineates HDLC packets in the incoming bit stream, drops defective packets, processes ICMP messages, segments the IP packet into AAL cells using a single fixed VPI/VCI value and transfers the AAL cells to an ATM switch 82. The transmit interface 62 receives AAL cells from the ATM switch 82, buffers the AAL cells until their payload type identifier (PTI) value indicates that a complete IP packet is stored in the buffer 64, verifies that the IP packet is error free and drops the IP packet if it has errors. The transmit interface 62 reads complete IP packets from the buffer 64, wraps the IP packets in the HDLC packet delineation format and transmits the IP packets over physical interface to the CPE 12.

In the network interface card 50, the receive interface 70 delineates HDLC packets in the incoming bit stream, recovers the IP destination address and uses the address in connection with the routing table 74 to determine the CPE interface port and VPI/VCI value for the IP packet, drops defective packets, processes ICMP messages, segments the IP packets into AAL cells and transfers the AAL cells to the ATM switch 82 in the switch core 44. The transmit interface 72 receives AAL cells from the ATM switch 82, buffers the AAL cells according to their CPE interface port number and VPI/VCI values until their PTI value indicates that a complete packet is stored in the buffer 76, verifies that the IP packet is error free and drops the IP packet if it has errors. The transmit interface 72 reads complete IP packets from the buffer 76, one at a time, wraps the IP packets in the HDLC packet delineation format and transmits the packets over the physical interface.

In operation, in the direction from the CPE 12 to the backbone network 16, all of the IP packets from each CPE interface 48 are segmented into AAL cells with the same virtual private interface/virtual connection interface (VPI/VCI) value. Before transmission to the backbone network 16, the AAL cells are reassembled into IP packets, with the AAL cells from each CPE interface 48 kept separate in the buffer 76 using the different incoming port numbers and VPI/VCI values. This prevents corruption of the IP packets and allows a single end-to-end outgoing packet stream to be constructed out of the many incoming streams.

In the direction from the backbone network 16 to the CPE 12, the destination address of all of the IP packets from the backbone network 16 are inspected. Using the routing table 74, the destination address of each IP packet is used to determine a unique VPI/VCI value associated with the appropriate outgoing port for the IP packet. The IP packet is then segmented into the AAL cell stream that employs the prescribed VPI/VCI value. The resultant ATM cells are switched and then reassembled into IP packets before transmission to the destination CPE 12.

Using the ATM-based switching, the CPE interface card 48 need not inspect a routing table. Further, the CPE interface card 48 segments incoming traffic into AAL cells with a single fixed VPI/VCI value and in the outgoing direction reassembles AAL cells with only a single VPI/VCI value. This simplifies the SAR process on the CPE interface card 48, which allows for cost reductions during implementation. Although the requirements placed on the backbone router 24 in the backbone network 16 are increased, the greater cost and complexity of the backbone router 24 interface is relatively small and effectively shared between a number of the CPEs 12.

FIG. 3 illustrates an access network 100 including an intra network ATM link in accordance with one embodiment of the present invention. In this embodiment, the ATM link extends between access devices. The ATM interfaces are not visible outside the access network 100.

Referring to FIG. 3, the access network 100 includes the first access device 110 and a second access device 112 connected in series between the CPE 102 and the backbone router 104, which each include IP interfaces. Ingress IP traffic from the CPE 102 is received, processed and converted to AAL cells for switching within the access device 110 as previously described in connection with the access device 20. The AAL cells are aggregated into a combined stream that is transferred to the second access device 112 over ATM link 114. The second access device 112 receives the combined stream of AAL cells and additional IP traffic from CPEs 115. The additional IP traffic is received, processed and converted to AAL cells for switching within the second access device 112 as previously described in connection with the access device 20. At the network port on the access device 112, the ATM traffic from the ATM link 114 and from the CPEs 115 is reassembled back into IP packets and aggregated into a single stream for transmission to the backbone router 104. In this way, traffic is efficiently switched as ATM traffic through a plurality of devices in the access network 100.

Figure 4:
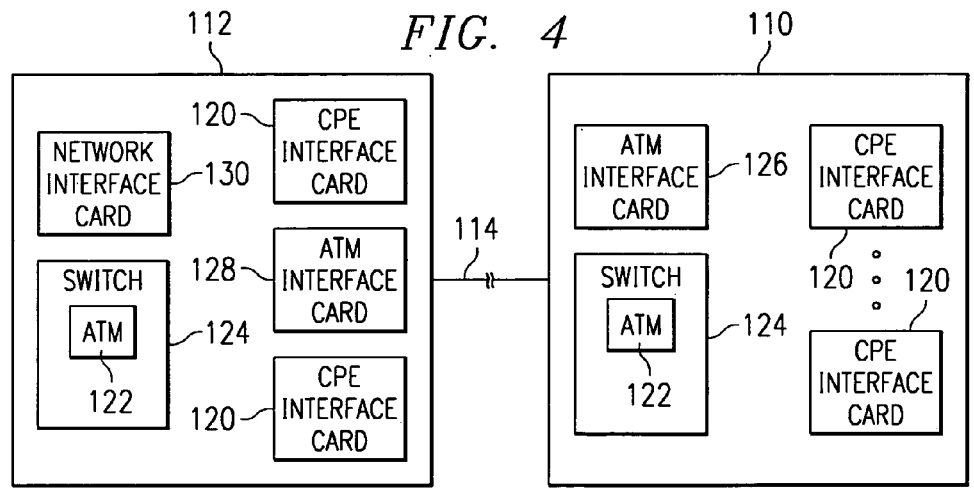
FIG. 4 is a block diagram illustrating details of the access devices of FIG. 3 in accordance with one embodiment of the present invention.

FIG. 4 illustrates details of the access devices 110 and 112 of FIG. 3 in accordance with one embodiment of the present invention. In this embodiment, the first and second access devices 110 and 112 include CPE interface cards 120 that are constructed and operate as described in connection with the CPE interface cards 48. ATM interface cards 126 and 128 are provided to transmit traffic between the access devices 110 and 112 across the ATM link 114.

In the ingress direction, the CPE interface cards 120 convert IP traffic to AAL cells and transmit the AAL cells to an ATM switch 122 in the switch core 124. In the first access device 110 distal from the network periphery of the access network 100, the ATM switch 122 switches the AAL cells to an ATM interface card 126 which transmits the cells over the ATM link 114 to an ATM interface card 128 in the second access device 112 at the network periphery of the access network 100. From the ATM interface card 128, the AAL cells are transferred to the network interface card 130 through the ATM switch 122. At the network interface card 130, the AAL cells are reassembled back into IP packets and aggregated with locally received and other CPE traffic for transmission to the backbone router 104.

In the egress direction, the second access device 112 proximate to the network periphery of the access network 100 receives IP traffic from the backbone router 104 and converts the IP traffic to AAL cells using a unique VPI/VCI value for each CPE port in the second access device 112 and the downstream first access device 110. AAL cells destined for locally connected CPEs 115 are switched to the local CPE interface cards 120 while AAL cells destined for downstream connected CPEs 102 are switched to the ATM interface card 128 for transport over the ATM link 114 to the ATM interface card 126 of the first access device 110. From the ATM interface card 126, the AAL cells are switched to appropriate CPE interface cards 120 for transport to the locally connected CPEs 102. At the CPE interface cards 120, the AAL cells are reassembled back into IP packets and transmitted to the corresponding CPEs 115 and 102. In this way, ATM links can be readily established between access devices to maximize efficiency within the access network 100.

Figure 5:
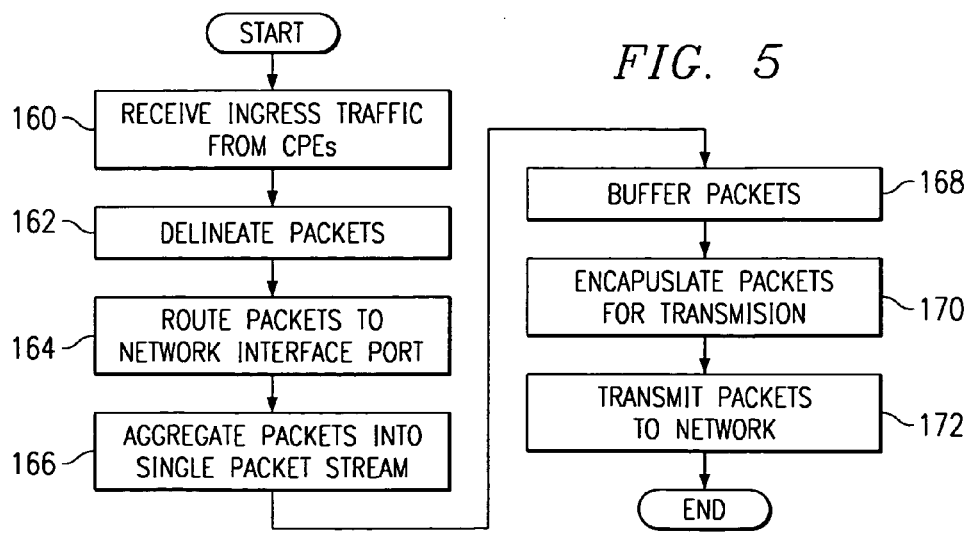
FIG. 5 is a flow diagram illustrating a method for processing ingress traffic in an access network in accordance with one embodiment of the present invention.

FIG. 5 is a flow diagram illustrating a method for processing ingress traffic in an access network in accordance with one embodiment of the present invention. In this embodiment, traffic is received, processed and transmitted in IP packets by access device 20. It will be understood that other or different types of suitable ingress datagrams may be processed by the access network without departing from the scope of the present invention.

Referring to FIG. 5, the method begins at step 160 in which an ingress traffic stream is received from each of a plurality of CPEs 12. The ingress traffic streams are received by the CPE interface cards 48 and include a plurality of IP packets having IP addresses. At step 162, the IP packets are delineated by the receive interface 60.

Proceeding to step 164, the IP packets are routed to a network interface port of the network interface card 50. In one embodiment, the IP packets are routed between the CPE interface card 58 and the network interface card 80 by the switch core 44 over the backplane 46. At the network interface card 50, the IP packets are aggregated into a combined packet stream by the transmit interface 72.

At step 168, the IP packets of the combined packet stream are buffered in the buffer 76. Next, at step 170, the IP packets are encapsulated as they are removed from the buffer 76 for transmission to and within the backbone network 16. At step 172, the IP packets are transmitted to the backbone network 16 for routing to a destination. Step 172 leads to the end of the process by which IP packets are processed in the ingress direction without need for routing decisions.

FIG. 6 is a flow diagram illustrating a method for processing egress traffic in an access network in accordance with one embodiment of the present invention. In this embodiment, traffic is received, processed and transmitted in IP packets by the access device 20. It will be understood that other different types of suitable egress datagrams may be processed by the access network without departing from the scope of the present invention.

Referring to FIG. 6, the method begins at step 180 in which an egress traffic stream is received by the network interface card 50 of the access device 20 from the backbone network 16. At step 182, HDLC packets in the egress traffic stream are delineated by the receive interface 70. At step 184, the IP destination address for each IP packet is recovered from the packet.

Proceeding to step 186, the CPE interface port for each IP packet is determined based on the IP destination address using the routing table 74. At step 188, each IP packet is routed to the identified CPE interface port by the switch core 44 over the backplane 46.

At step 190, the IP packets are buffered at each CPE interface port by the buffer 64. At step 192, the packets are encapsulated as they are removed from the buffer 64 by wrapping them in the HDLC packet delineation format. The IP packets are then transmitted from each port to the corresponding CPE at step 194. Step 194 leads to the end of the process by which egress traffic from the backbone network 16 is routed using static routing information.

FIG. 7 is a flow diagram illustrating a method for processing ingress traffic in an access network using ATM switching in accordance with one embodiment of the present invention. In this embodiment, traffic is received as IP packets and segmented into AAL cells for routing in the access network by access device 20. It will be understood that traffic may be received in other suitable datagrams and segmented into and reassembled from other types of cells or converted to other formats for access routing.

Referring to FIG. 7, the method begins at step 200 in which ingress traffic is received at the CPE interface card 48 of the access device 20 from the CPEs 12. At step 202, HDLC packets in the traffic streams are delineated. At step 204, the packets are validated. Defective packets are dropped at step 206.

Proceeding to step 208, the IP packets are segmented into AAL-5 or other suitable ATM cells using a fixed ATM address for each CPE interface port. In one embodiment, the fixed ATM address is a fixed VPI/VCI. Other suitable ATM values uniquely identifying the CPE ports may be used.

At step 210, the AAL cells are transferred to the ATM switch 82. At step 212, the AAL cells are switched to a common interface port on the network interface card 50 for transmission to the backbone network 16. At step 214, the AAL cells are buffered at the network interface port based on the CPE port and ATM address. Thus, packets from each CPE interface are kept separate using their different incoming port numbers and VPI/VCI values. This prevents corruption of the packets and facilitates construction of a single end-to-end outgoing packet stream out of the incoming streams.

Next, at step 216, after the AAL cells forming an IP packet are received at the network interface port, the IP packet is reassembled from the complete set of AAL cells. In one embodiment, the AAL cells are buffered until their PTI value indicates a complete packet is stored in the buffer. The IP packet is validated at step 218. Defective packets are dropped at step 220.

At step 222, the IP packets are encapsulated in the HDLC packet delineation format. The packets are transmitted over the physical interface to the backbone network 16 at step 224. Step 224 leads to the end of the process by which ingress IP packets are efficiently access routed using ATM switching.

Figure 8:
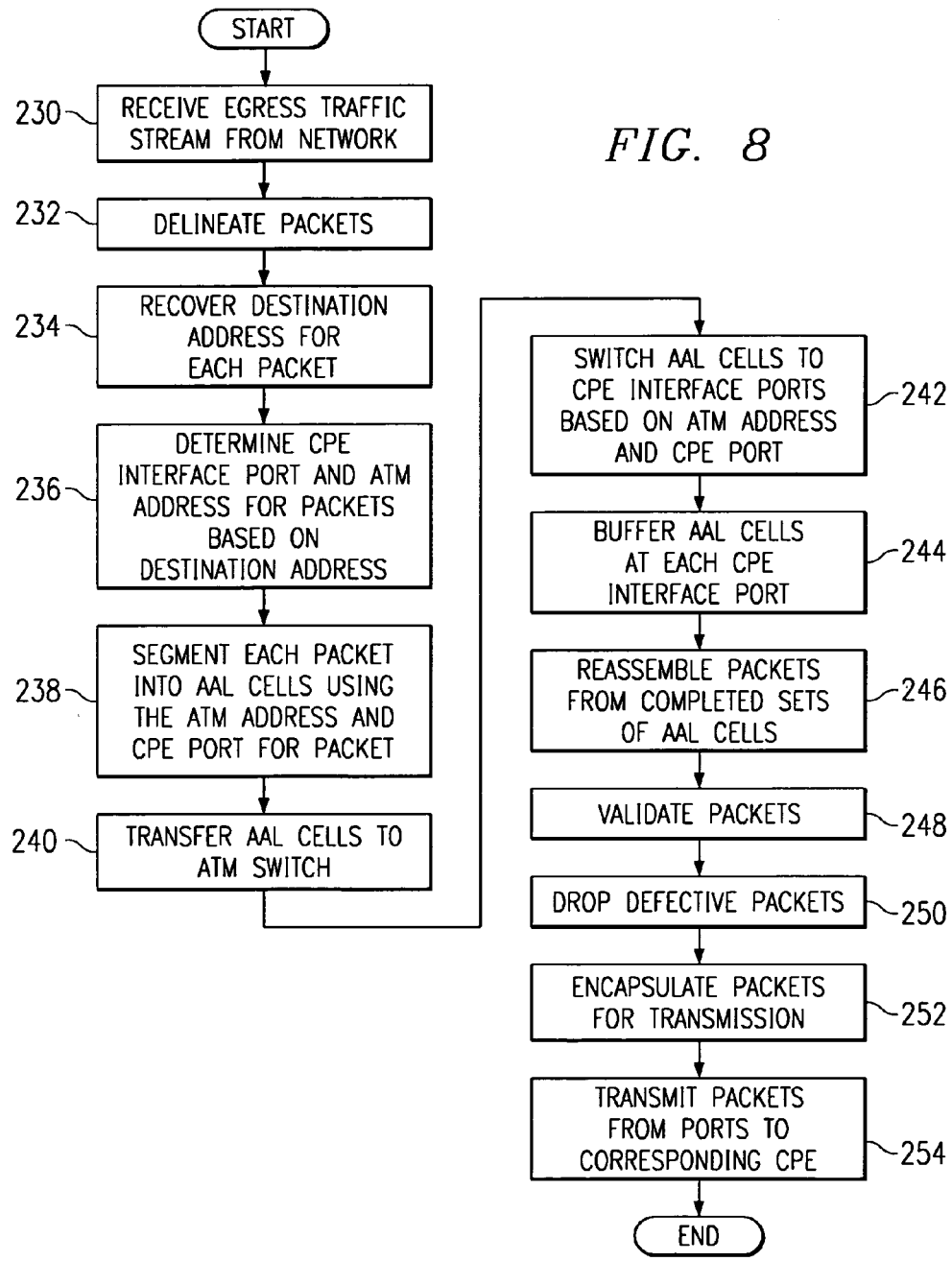
FIG. 8 is a flow diagram illustrating a method for processing egress traffic in an access network using ATM switching in accordance with one embodiment with the present invention.

FIG. 8 is a flow diagram illustrating a method for routing egress traffic in an access network using ATM switching in accordance of the present invention. In this embodiment, traffic is received in IP packets and segmented into AAL cells for routing within the access network by access device 20. It will be understood that traffic may be received in other suitable types of datagrams and segmented into and reassembled from other types of cells or converted to other formats for access routing.

Referring to FIG. 8, the method begins at step 230 in which an egress traffic stream is received from the backbone network 16 by the receive interface 70 of the network interface card 50. At step 232, HDLC packets are delineated from the egress traffic stream. The destination address for each packet is recovered at step 234 by the receive interface 70.

Proceeding to step 236, the CPE interface port and ATM address is determined for each IP packet based on the destination address. In one embodiment, the CPE interface port and ATM address are determined using the routing table 74. In this embodiment, ATM address is an assigned VPI/VCI or other suitable unique identifier.

Next, at step 238, each IP packet is segmented into AAL-5 or other suitable ATM cells using the ATM address and CPE port. The AAL cells are transferred to the ATM switch 82 at step 240. At step 242, the AAL cells are each switched to a CPE interface port identified by the ATM address and CPE port.

Proceeding to step 244, the AAL cells are buffered at each CPE interface port in the buffer 64. Each CPE interface port will have only one string of AAL cells with a single VPI/VCI value. At step 246, after all AAL cells forming an IP packet are received at the CPE interface port, the IP packet is reassembled from the complete set of AAL cells. In one embodiment, the AAL cells are buffered until their PTI value indicates that a complete packet is stored in the buffer 64. The IP packet is then validated at step 248. Defective packets are dropped at step 250.

At step 252, the IP packets are encapsulated by wrapping them in the HDLC packet delineation format. At step 254 the IP packets are transmitted over the physical interface to the corresponding CPE 12. In this way, traffic is efficiently routed and switched within the access network 14 using static routing information.

Although the present invention has been described with several embodiments, various changes and modifications may be suggested to one skilled in the art. It is intended that the present invention encompass such changes and modifications as fall within the scope of the appended claims.

What is claimed is:

1. A method for processing traffic in an access network, comprising:
   receiving a plurality of ingress traffic streams at a plurality of customer premise equipment (CPE) ports, each ingress traffic stream including a plurality of packets having a destination address, wherein the packets are Internet Protocol (IP) packets and each include an IP destination address;
   segmenting at each CPE port the IP packets in the ingress traffic streams into asynchronous transport mode (ATM) adaption layer (AAL) cells having a fixed ATM address associated with the CPE port, wherein the AAL cells include either or both of a virtual private interface and virtual connection interface (VPI/VCI) ATM address generated from the IP addresses of the IP packets;
   aggregating the ingress traffic streams into a single combined traffic stream; and
   transmitting the combined traffic stream to a backbone network for routing.

2. The method of claim 1, further comprising:
   receiving each of the ingress traffic streams from customer premise equipment (CPE); and
   transmitting the combined traffic stream to a backbone router in the backbone network.

3. The method of claim 1, further comprising:
   validating IP packets in the ingress traffic streams; and
   aggregating all valid packets into the combined traffic stream.

4. The method of claim 1, further comprising:
   routing IP packets of the ingress traffic streams to a network interface port of an access device; and
   aggregating the IP packets into the combined traffic stream at the network interface port.

5. The method of claim 1, further comprising:
   switching the AAL cells to a network interface port;
   reassembling the IP packets from the AAL cells at the network interface port; and
   aggregating the IP packets into the combined traffic stream.

6. The method of claim 5, further comprising:
   buffering the AAL cells at the network interface port based on their ATM addresses; and
   reassembling the IP packets from completed sets of AAL cells.

7. The method of claim 5, wherein the IP packets are segmented into ATM adaption layer five (AAL-5) cells.

8. The method of claim 1, further comprising:
   receiving an egress traffic stream from the backbone network, the egress traffic stream including a plurality of IP packets each having an IP address;
   determining a customer premise equipment (CPE) port for each IP packet based on its IP address;
   routing the IP packets to their respective CPE ports; and
   transmitting the IP packets from the CPE ports to their destination CPEs.

9. The method of claim 8, further comprising determining the CPE ports for the IP packets using a static routing table.

10. The method of claim 8, further comprising:
   determining an asynchronous transport mode (ATM) address for each IP packet of the egress traffic stream based on its IP address;
   segmenting each IP packet into a set of ATM adaption layer (AAL) cells having the ATM address for the IP packet;
   switching the AAL cells to their respective CPE ports based on the ATM addresses; and
   reassembling the IP packets from the AAL cells at each CPE port for delivery.

11. The method of claim 10, further comprising:
buffering the AAL cells at each CPE port based on their ATM addresses; and
reassembling the IP packets from completed sets of AAL cells.

12. The method of claim 10, wherein the ATM address comprises either or both of a virtual private interface and virtual connection interface (VPI/VCI) address.

13. The method of claim 10, wherein the IP packets are segmented into ATM adaption layer five (AAL-5) cells.

14. A non-transitory computer readable medium comprising logic for processing traffic in an access network, the logic, when executed by a processor, operable to:
receive a plurality of ingress traffic streams at a plurality of customer premise equipment (CPE) ports, each ingress traffic stream including a plurality of Internet Protocol (IP) packets having an IP address,
segmenting at each CPE port the IP packets in the ingress traffic streams into asynchronous transport mode (ATM) adaption layer (AAL) cells having a fixed ATM address associated with the CPE port, wherein the AAL cells include either or both of a virtual private interface and virtual connection interface (VPI/VCI) ATM address generated from the IP addresses of the IP packets;
aggregate the ingress traffic streams into a combined traffic stream, and
transmit the combined traffic stream to a backbone network for routing based on the IP addresses.

15. The non-transitory computer readable medium of claim 14, the logic further operable to transmit the combined traffic stream to a backbone router in the backbone network.

16. The non-transitory computer readable medium of claim 14, the logic further operable to validate IP packets in the ingress traffic stream and to aggregate all valid packets into the combined traffic stream.

17. The non-transitory computer readable medium of claim 14, the logic further operable to route IP packets in the ingress traffic streams to a network interface port of an access device and to aggregate the IP packets into the combined traffic stream at the network interface port.

18. The non-transitory computer readable medium of claim 14, the logic further operable to receive the ingress traffic streams at a plurality of customer premise equipment (CPE) ports, segment at the CPE ports the IP packets in the ingress traffic streams into asynchronous transport mode (ATM) adaption layer (AAL) cells, switch the AAL cells to a network interface port, reassemble the IP packets from the AAL cells at the network interface port and aggregate the IP packets into the combined traffic stream, wherein the AAL cells include either or both of a virtual private interface and virtual connection interface (VPI/VCI) address generated from the IP addresses of the IP packets.

19. The non-transitory computer readable medium of claim 18, wherein the IP packets are segmented into ATM adaption layer five (AAL-5) cells.

20. The non-transitory computer readable medium of claim 18, the logic further operable to buffer the AAL cells at the network interface port based on their ATM addresses, and reassemble the IP packets from completed sets of AAL cells.

21. The non-transitory computer readable medium of claim 14, the logic further operable to receive an egress traffic stream from the backbone network, the egress traffic stream including a plurality of IP packets each having an IP address, determine a customer premise equipment (CPE) port for each IP packet based on its IP address, route the IP packets to their respective CPE ports and transmit the IP packets from the CPE ports to their destination CPEs.

22. The non-transitory computer readable medium of claim 21, the logic further operable to determine the CPE ports for the IP packets using a static routing table.

23. The non-transitory computer readable medium of claim 21, the logic further operable to determine an asynchronous transport mode (ATM) address for each packet based on its IP address, segment each IP packet into a set of ATM adaption layer (AAL) cells having the ATM address for the IP packet, switch the AAL cells to their respective CPE ports based on the ATM addresses and reassemble the IP packets from the AAL cells at each CPE port for delivery based on their IP addresses.

24. The non-transitory computer readable medium of claim 23 the logic further operable to buffer the AAL cells at each CPE port based on their ATM addresses and reassemble the IP packets from completed sets of AAL cells.

25. The non-transitory computer readable medium of claim 23, wherein the IP packets are segmented into ATM adaption layer five (AAL-5) cells.

* * * * *